Feb. 2, 1954
C. P. SONIUS
2,668,273
VOLTAGE REDUCING DEVICE FOR WELDING TRANSFORMERS
Filed Sept. 13, 1950
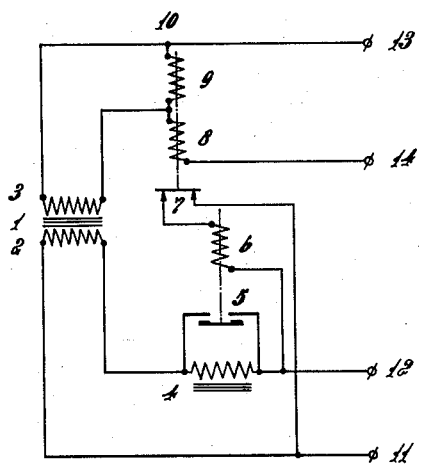
INVENTOR.
Cornelis P. Sonius
BY
Young, Emery & Thompson
Attys.

Patented Feb. 2, 1954

2,668,273

UNITED STATES PATENT OFFICE 2,668,273

VOLTAGE REDUCING DEVICE FOR WELDING TRANSFORMERS

Cornelis Pieter Sonius, Groningen, Netherlands, assignor to Vennootschap onder firma Oscar Keip, Groningen, Netherlands, a corporation of the Netherlands Application September 13, 1950, Serial No. 184,617

Claims priority, application Netherlands September 22, 1949

1 Claim. (Cl. 323—60)

This invention relates to a voltage reducing device more particularly for welding transformers by which the unloaded voltage of the secondary is reduced to a value which guarantees safety to the welder.

Voltage reducing devices are known which comprise a voltage reducing choke coil connected in series with the primary circuit of the welding transformer, which choke coil is short-circuited by means of a relay when said relay is energized by the first rush of current in the secondary circuit, for example when the welding electrode contacts the work piece.

Since this first rush of current in the welding circuit is of a relatively low intensity, because the voltage reducing choke coil is connected in the primary circuit of the welding transformer in this instance, the relay must be dimensioned so that at this low initial current the magnetic flux through the relay armature is great enough to guarantee that the relay will operate, for which purpose said relay must be provided with a current coil having a relatively large number of windings.

If after the operation of the relay the voltage reducing choke coil has once been bridged, the transformer has its primary winding connected to the full voltage of the mains and on the secondary winding the full power is available so that the welding current will increase to a maximum value.

During the welding operation the relay remains energized under the influence of the welding current, the intensity of which is many times higher than that of the first rush of current, so that owing to this high intensity of the welding current and the great number of windings, the magnetic flux through the iron of the relay may increase to such a value as to create a supersaturation owing to which the iron is greatly heated and becomes burned.

The object of this invention is to obviate this drawback by avoiding a super-saturation of the iron of the voltage reducing relay.

It is also known to energize the relay connecting the voltage reducing choke coil in the primary winding of the welding transformer, instead of by the welding current in the secondary winding of the welding transformer, by means of the influence of the welding voltage. In this case the relay is provided with a voltage coil, instead of a current coil.

The use of a voltage coil only has the drawback that the relay must respond already to a voltage that is harmless to the welder, whereas the welding voltage which during the welding process will act continuously on the relay is considerably higher. This drawback is even more serious when steel electrodes and deep burn in electrodes or long welding cables all of which require high voltages, are used.

If the safety device is to answer its purpose, the voltage during the period that no welding is being done, will have to be reduced to below 42 volts, so that the relay with a voltage coil must respond to a secondary voltage below 42 volts.

On account of the use of long welding cables, which will cause a considerable loss of voltage and the modern use of steel electrodes and deep burn in electrodes, the secondary voltages of the welding transformer are considerably higher than 42 volts, so that constructions comprising a voltage coil are unsuitable for modern welding transformers.

According to the invention a voltage reducing device for a welding transformer wherein by means of a relay connected in the secondary circuit of the transformer, a choke coil inserted in the primary circuit is bridged, comprising a relay having a current coil connected in series with the secondary circuit, and a voltage coil connected in parallel with the secondary winding of the transformer, the relay contacts being open only when the voltage coil is energized and being closed in the inoperative position of the relay by the action of the armature's own weight and/or by a spring acting on said armature and in the energized condition of the current coil.

The invention will now be described with reference to the accompanying drawing, which illustrates a preferred embodiment of a circuit arrangement in which a relay according to the invention is used.

The welding transformer 1 has its primary winding 2 connected to the terminals 11 and 12 of the feeding mains via a voltage reducing choke coil 4. The ends of the choke coil 4 are connected with the contacts of a relay 6 and are short-circuited by a bridge-contact 5 in the operative condition of the relay 6.

Furthermore, the welding transformer has its secondary winding 3 connected with a voltage coil 9 of a relay 10, which voltage coil is connected in parallel with said secondary winding 3.

The said voltage coil consists of a relatively large number of windings of insulated thin copper wire. The relay 10 comprises also a current coil 8 of a relatively small number of windings of insulated thick copper wire. The current coil 8 is connected in series with the welding circuit which is closed via the terminals 13 and 14. The two coils 8 and 9 act on the armature of the relay 10. In the non-energized condition of the coils 8 and 9 the contacts 7 of the relay 10 are closed because the armature under the influence of its own weight or under the action of a spring is in the inoperative condition. Furthermore the relay 10 is constructed so that if only the voltage coil 9 is energized the armature is drawn out of the inoperative condition and the contacts 7 are opened. If only the current coil 8 is energized, the contacts 7 are closed and if in addition the voltage coil 9 is subsequently energized, this coil is not able to move the armature in opposition to the action of gravity and/or of the spring and in opposition to the action of the current coil, to open the contacts 7.

The coil of the relay 6 is energized by the current from the mains via the contacts 7.

Before the welding apparatus is connected to the feeding mains 11, 12 the two relays 6 and 10 are in the inoperative condition, the bridge contact 5 is open and the contacts 7 are closed.

When the welding apparatus is connected to the feeding mains, the voltage coil 9 of the relay 10 will be energized by the current from the secondary winding 3 of the welding transformer 1 whereby the armature of this relay will operate and open the contact 7, so that the relay 6 continues unenergized and the voltage-reducing choke coil 4 is included in the primary circuit of the welding transformer, while the secondary voltage has a value which guarantees safety to the welder.

When subsequently the welding operation is initiated by contacting the welding electrode with the work-piece, the terminals 13 and 14 are short circuited thereby so that the secondary voltage will drop sharply and the energization of the voltage coil 9 will be discontinued, as a result of which the armature of the relay 10 will be released and the contacts 7 will be closed. The relay 6 via said contacts is now energized by the current from the feeding mains, so that the bridge-contact 5 will now short-circuit the voltage reducing coil 4, as a result of which the full voltage of the mains will be applied to the primary winding of the welding transformer and the full power will become available at the secondary side of the welding transformer.

The welding current through the secondary circuit comprising the current coil 8, increases so that now the armature is held in the position in which the contacts remain closed, notwithstanding the fact that the voltage coil 9 is again energized by the returning secondary voltage.

When at the end of the welding operation the load is removed, the current coil is deenergized and the armature of the relay 10 is only attracted by the energization of the voltage coil 9 as a result of which the contact 7 will open and the relay 6 will become inoperative, so that the voltage-reducing choke coil is cut in and the secondary voltage will again drop to a safe value.

Since according to the present invention the current coil 8 only has to prevent the armature of the relay 10 from being attracted by the voltage coil 9, wherein said current coil is assisted by the action of gravity and/or the action of a spring on the armature, said coil 8 may be provided with a small number of windings only, so that notwithstanding the high intensity of the welding current passing through this coil the possibility of the iron being burnt is excluded. Also in view of the manufacture of the current coil in which manufacture a thick wire capable of carrying the maximum welding current has to be used, a small number of windings constitutes an advantage over the current coil, or the voltage coil, of the known devices.

I claim:

A voltage reducing device for welding transformers having a primary winding and a secondary winding, a primary circuit including said primary winding, a secondary circuit including said secondary winding, comprising a choke coil connected in the primary circuit, a contactor for short circuiting the choke coil, a relay for actuating the contactor including an actuating armature having a tendency to move to contact closing position, a voltage coil connected in parallel with the secondary winding of the transformer and positioned to magnetically move the actuating armature to contact opening position upon the application of the voltage of the secondary winding thereto, and a current coil connected in the secondary circuit in series with the secondary winding of the transformer and positioned to magnetically overcome the magnetic effect of the voltage winding and shift the actuating armature to contact closing position upon the flow of current from the secondary winding through the current winding.

CORNELIS PIETER SONIUS.

References Cited in the file of this patent

UNITED STATES PATENTS

| Number | Name | Date |
|---|---|---|
| 1,343,203 | Eschholz | June 15, 1920 |
| 1,343,204 | Eschholz | June 15, 1920 |
| 1,343,205 | Eschholz | June 15, 1920 |

FOREIGN PATENTS

| Number | Country | Date |
|---|---|---|
| 143,490 | Switzerland | Nov. 15, 1930 |